July 23, 1968     A. H. KING     3,393,718

BOWLING PIN REPAIR APPARATUS

Filed July 30, 1965     3 Sheets-Sheet 1

INVENTOR

ARVIL H. KING

BY Strauch, Nolan, Neale,
Nies & Bronaugh
ATTORNEYS

July 23, 1968

A. H. KING 3,393,718

BOWLING PIN REPAIR APPARATUS

Filed July 30, 1965

ARVIL H. KING

BY Strauch, Nolan, Neale,
Nies & Bronaugh
ATTORNEYS

July 23, 1968     A. H. KING     3,393,718
BOWLING PIN REPAIR APPARATUS
Filed July 30, 1965     3 Sheets-Sheet 3
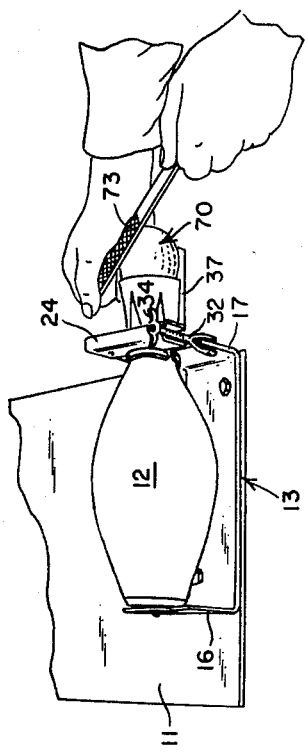
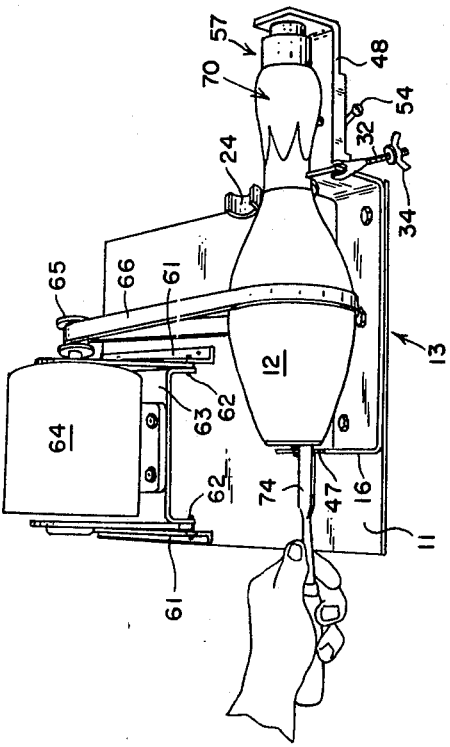
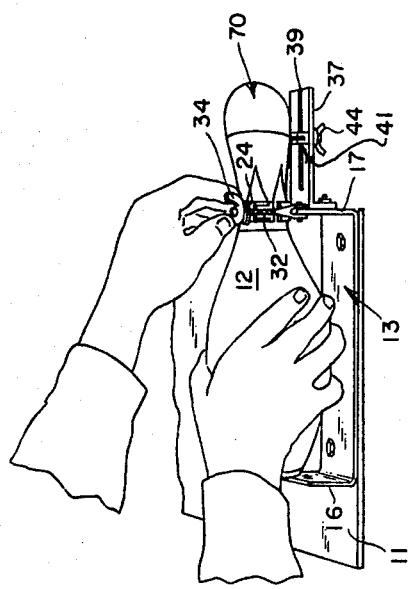
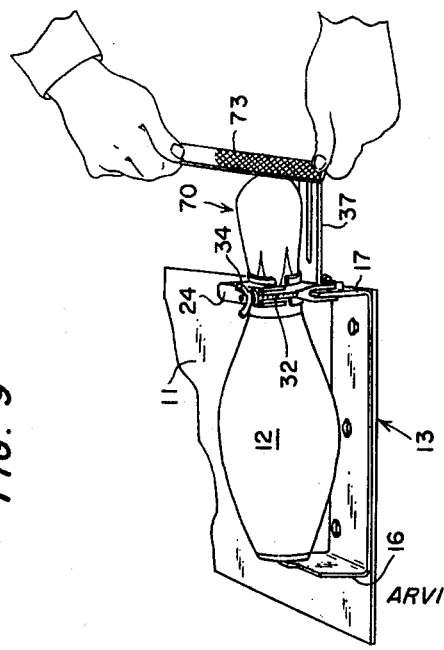
INVENTOR
ARVIL H. KING
BY *Strauch, Nolan, Neale, Nies & Bronaugh*
ATTORNEYS

United States Patent Office 3,393,718
Patented July 23, 1968

3,393,718
BOWLING PIN REPAIR APPARATUS
Arvil H. King, 391 S. 4th W.,
Logan, Utah 84321
Filed July 30, 1965, Ser. No. 475,919
11 Claims. (Cl. 144—2)

ABSTRACT OF THE DISCLOSURE

Apparatus for repairing damaged bowling pins comprises a support having spaced arms horizontally supporting the pin. One arm has an arbor journally the base of the pin. The other ram has an arcuate jaw wherein the pin neck is rotatably supported or may be clamped. An upper jaw is flexibly pivoted by a special pivoted link structure on the lower jaw, and the jaws grip the pin neck for some operations. A platform extends from the other arm to underlie the pin head and it carries both a rotatable cup support for the pin head and a cutting tool for certain operations on the pin. A motor on the support has a belt for rotating the pin during certain operations when the upper jaw is released.

---

This invention relates to apparatus for the repair of bowling pins, and particularly to such apparatus having special pin holding arrangements which provide a combination vise and lathe for bowling pin repair.

Bowling pins in use today comprise wooden bodies coated with a relatively thin layer of plastic material which becomes damaged during the rigorous treatment to which the pin is subjected. The repair of such pins has become a major problem, and the present invention is directed to novel extremely useful mechanical arrangements providing a combination pin holding vice and lathe enabling the different repair operations to be readily and speedily carried out with a minimum of apparatus.

It is, therefore, the major object of this invention to provide a novel association of apparatus providing a combination vice and lathe for bowling pin repair.

Another object of the invention is to provide a bowling pin repair apparatus having a novel pin holding vise structure.

A further object of the invention is to provide a bowling pin repair apparatus wherein the pin may be rotatably mounted in a novel manner.

A further object of the invention is to provide a novel bowling pin repair apparatus wherein the apparatus may be arranged as a vise for holding the pin tight for certain operations and readily rearranged to provide a lathe structure rotatably holding the pin for turning operations.

Further objects of the invention will appear as the description proceeds in connection with the appended claims and the annexed drawings wherein:

FIGURES 9–12 are diagrammatic views showing various operations on a bowling pin held in the apparatus of the invention.

Figure 1:
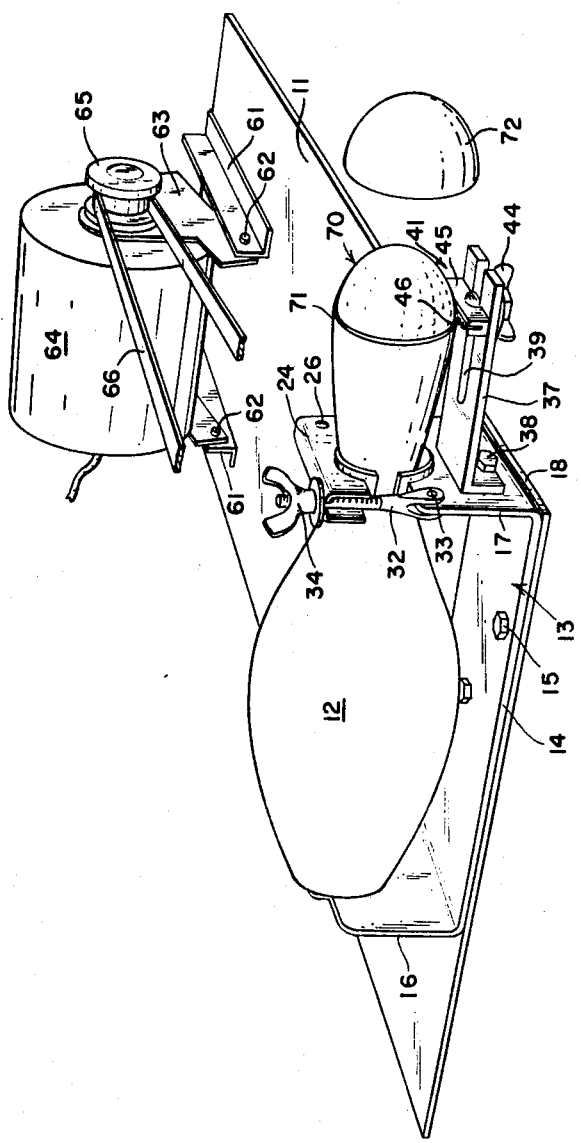
FIGURE 1 is a generally perspective diagrammatic view showing apparatus according to a preferred embodiment of the invention with a bowling pin installed for repair.

The apparatus comprises, according to a preferred embodiment of the invention, a relatively sturdy base in the form of a rigid metal plate 11 which may be clamped or otherwise mounted in horizontal position upon a suitable table, bench or other support.

The bowling pin 12 to be repaired is mounted in a suitable holding structure comprising a U-shaped rigid metal member 13 having its bridge 14 secured to base plate 11 as by screws 15 and parallel upright end arms 16 and 17 perpendicular to plate 11. One arm 17 is flush with the front edge 18 of plate 11.

Figure 7:
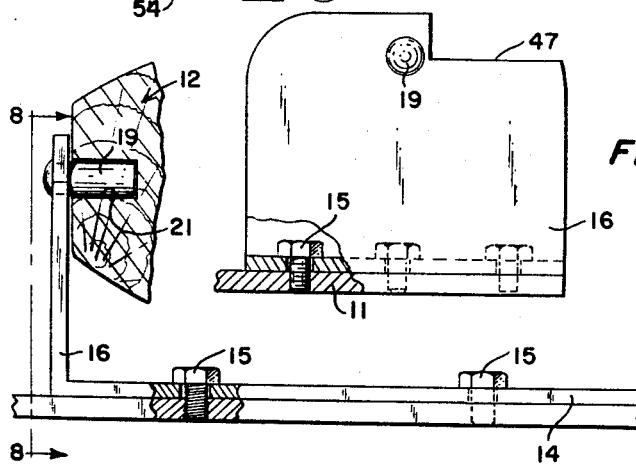
FIGURE 7 is a fragmentary side elevation partially broken away and in section showing the base plate structure.

Rear arm 16 (FIGURE 7) is provided with a cylindrical arbor 19 adapted to fit into a correspondingly shaped recess 21 in the base of pin 12 for freely rotatably supporting the pin 12 for rotation about its axis, this axis being substantially horizontal in the assembly.

Figure 2:
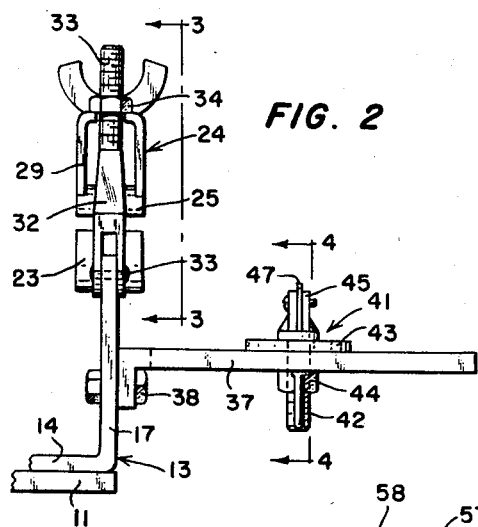
FIGURE 2 is an enlarged fragmentary side elevation showing the pin holding vise and associated cutting tool.
Figure 3:
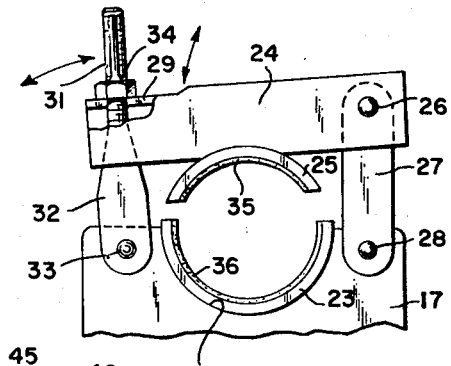
FIGURE 3 is a fragmentary front elevation of the vise jaw arrangements substantially on line 3—3 of FIGURE 2.

With reference to FIGURES 1, 2 and 3 the upper end of arm 17 is formed with an upwardly concave circularly curved recess 22 in which is rigidly secured as by welding a substantially semicircular metal sleeve 23 constituting the lower jaw of a vise.

An upper arm 24 has secured upon its lower side a downwardly open circularly curved metal sleeve 25 disposed above sleeve 23 to constitute the upper jaw of the vise. At one end arm 24 is pivoted at 26 to a generally vertical link 27 pivoted to arm 17 at 28. The other end of arm 24 is bifurcated at 29 to receive the threaded upper end 31 of a generally vertical link 32 pivoted to arm 17 at 33. A wing nut 34 is mounted on link 32 above arm 24. The upper and lower vise jaws are lined with leather or some like soft friction gripping material at 35 and 36 so as not to mar the surface of the bowling pin neck when nut 34 is tightened as will appear.

The upper vice jaw is preferably slightly off center vertically with respect to the lower vise jaw to compensate for the pivotal movement of arm 24 when the bowling pin 12 is clamped in place.

Figure 4:
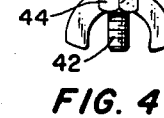
FIGURE 4 is a section substantially on line 4—4 of FIGURE 2 showing the cutting tool.

Referring to FIGURES 1, 2 and 4, a substantially horizontal tool holding platform 37 is secured upon the front side of arm 17, as by bolts 38. Platform 37 is formed with a front end open slot 39 that is adapted to slidably adjustably mount a cutting tool unit 41 comprising a threaded stud 42 having an enlarged head 43 above the platform and a wing nut 44 below the platform. The cutting tool 45 having a serrated cutting face 46 is rigid with the stud head and extends horizontally transversely of the axis of rotation of the bowling pin as will appear. When nut 44 is drawn tight the cutting tool is operatively secured to platform 37.

Figure 8:
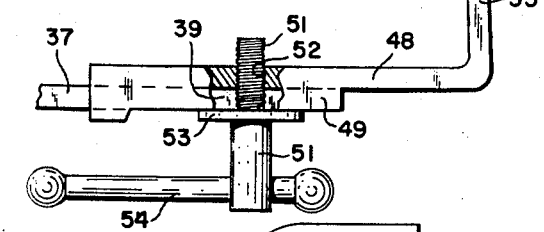
FIGURE 8 is a rear end elevation partially broken away and in section and substantially along line 8—8 of FIGURE 7, showing the support for a tool acting on the base of the bowling pin.

As shown in FIGURE 8 a horizontal flat surface 47 is formed on the upper side of rear arm 16. This is an accurately located tool rest for a purpose to appear.

Figure 5:
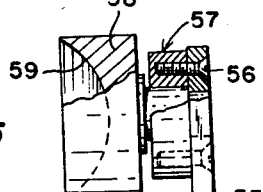
FIGURE 5 is a side elevation of the apparatus with a pin end mount used in a different operation from that shown in FIGURE 1.
Figure 6:
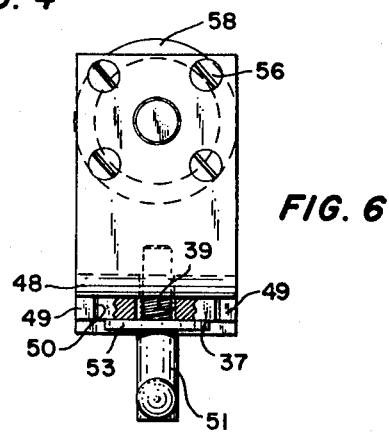
FIGURE 6 is a front elevation of the pin end mount of FIGURE 5.

With reference now to FIGURES 5 and 6, an accessory attachment is shown on platform 37, usually mounted when tool 45 is removed. This attachment comprises a forwardly extending bar 48 having depending sides 49 forming a channel 50 slidably fitting onto platform 37. A threaded stud 51 rotatably depending from threaded aperture 52 in the bar has an enlarged section 53 for engaging the underside of platform 37 and an operating handle 54.

At its forward end bar 48 is bent upwardly at right angles to provide a generally vertical arm 55 upon the rear surface of which is secured as by screws 56 a bearing assembly 57 rotatably mounting a cup member 58 formed with a smooth arcuate surface 59 adapted to snugly receive the small end of the bowling pin during certain operations.

Base plate 11 also has a pair of brackets 61 which pivotally mount at 62 the base 63 of an electric motor 64. The output motor shaft carries a pulley 65 for driving a soft leather belt 66 that is adapted (FIGURE 12) to encircle the body of pin 12 during some operations. As shown in FIGURES 1 and 2 the weight of motor 64 is so disposed with respect to pivot 62 that the motor is biased clockwise about the pivot by that weight to automatically provide a tight belt drive independent of pin eccentricities and similar variables.

The usual bowling pin is a smoothly turned wooden shape coated with a plastic smooth layer. This layer becomes frequently damaged particularly at the small head of the pin, and this is a frequent repair problem. An operation using the apparatus of the invention for this repair operation is illustrated in the drawings.

With first reference to FIGURE 1, the bowling pin 12 has its usual recess 21 fitted over arbor 19 and its slender neck rests in the lower jaw, arm 24 being swung out of the way to permit this, with the pin head 70 extending forwardly over platform 37.

Cutting tool 45 is now adjusted along slot 39 and tightened in desired location, usually just below the largest diameter of the pin head. Actually engagement of the cutting tool raises the pin neck slightly upwardly in the lower vise jaw. Now the vice jaws are drawn together by turning the nut 34, this action depressing the pin head until the blade teeth 46 bite into the plastic layer. The pressure of the cutting tool against the pin may be varied by wing nut 34, and any degree of tightness can be obtained around the neck of the pin in the vise.

In the operation shown in FIGURES 1 and 9, the vise is tightened only sufficiently to insure that blade 46 cuts through the plastic layer indicated at 71, and then the entire pin which is effectively rotatably mounted on a horizontal axis by arbor 19 and the vise jaws, is slowly rotated by hand through one or more full circles. The damaged plastic cover of the pin head now can be removed in the form of the detached cap 72 shown in FIGURE 1 and the pin head is now bared down to the wood.

Now the nut 34 can be drawn fully tight to hold pin 12 stationary in the vise and the repairman, as shown in FIGURE 10, can work on the wooden head 70 with a tool such as file 73 to clean off remaining plastic or the like and roughen it so that it will more readily retain liquid plastic applied during an ensuing dip operation.

FIGURE 11 illustrates the bowling pin held clamped in the vise, where the operator is using the file to smooth off any uneven spots resulting from dipping, or to smooth off the edges of a small applied plastic patch.

FIGURE 12 illustrates the operation where a defect at the base of the bowling pin 12 is to be repaired. The cutting tool is removed from platform 37, and extension bar 48 installed and properly located and held by tightened stud 51. In this operation the recessed base is rotatably supported by arbor 19 as in FIGURE 7, the upper vise arm 24 is thrown loose as in FIGURE 12, the pin head seats axially in bearing socket 59, and belt 66 passes over the large diameter of the pin body. Since the pin 12 is freely rotatably mounted on its longitudinal axis free of the lower vise jaw and is restrained to rotate only on this axis, an effective lathe is provided whereby the motor driven belt 66 rotates pin 12 about its axis when the motor is energized. The operator (FIGURE 12) may now rest a chisel 74 or like tool on surface 47 and the base of the pin can be speedily turned free of damaged areas.

Obviously the apparatus in its various arrangements can be used to perform other operations than the foregoing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Bowling pin repair apparatus comprising a support, an arm upstanding rigidly from said support and having means for rotatably mounting the base of a bowling pin, and a jaw structure on said base providing an operable vise for gripping the neck of said bowling pin, said jaw structure comprising means defining an upwardly open lower stationary jaw on the support and an upper jaw flexibly pivotally connected to the support at one side of the lower jaw and pivotally connected to the support at the other side of said lower jaw.

2. In the apparatus defined in claim 1, said pivotal connections between the upper jaw and support comprising a pair of links each pivoted on the lower part of said jaw structure and operably connected at their upper ends to the upper jaw.

3. In the apparatus defined in claim 2, one of said links being pivotally connected to said upper jaw, and the other of said links having a releasable non-pivotal fastening connection with said upper jaw.

4. In the apparatus defined in claim 3, said upper and lower jaws comprising relatively short arcuate metal sleeves lined with relatively soft gripping material.

5. In the apparatus defined in claim 1, said lower jaw comprising a lower arm rigid with the support and arcuately recessed at its upper edge to receive the bowling pin neck so that it may snugly grip the neck of the bowling pin when used for part of a vise and may smoothly rotatably support the neck of the bowling pin when the pin is rotated on its axis on the support, and said upper jaw comprising an arm flexibly pivoted on said rigid lower arm at one end and having a separable pivoted clamp connection to the lower arm at its other end, and means on said support for pivotally supporting the neck end of said bowling pin for rotation of the pin on its axis when the upper jaw is opened to permit said rotation.

6. Vise structure for a bowling repair device comprising a vertical lower arm, a link pivoted on said lower arm, an upper arm pivoted at one end on said link, a clamping link pivoted on said lower arm and having a detachable connection with said upper arm, said arms having oppositely facing associated concave jaw recesses for gripping a bowling pin neck.

7. Bowling repair apparatus comprising a support, means for rotatably mounting a bowling pin on said support for rotation about its longitudinal axis comprising axially aligned mounting elements operatively engaging the base and head respectively of said pin, and means comprising a rigid member formed with an upwardly facing ledge adjacent the pin base mounting element for positioning a tool in operative engagement with the base of said rotatably mounted bowling pin.

8. Bowling repair apparatus comprising a support, means for rotatably mounting a bowling pin on said support for rotation about its longitudinal axis comprising spaced arms on the support having means rotatably supporting the base and neck respectively of said pin, a platform projecting from the neck supporting arm to underlie the pin head and carrying means for rotatably mounting the pin head and a motor on said support having a belt adapted for rotating said pin.

9. Bowling repair apparatus comprising a support means for rotatably mounting a bowling pin on said support for rotation about its longitudinal axis, and means for positioning a tool in operative engagement with the head of said rotatably mounted bowling pin, said tool positioning means comprising a platform fixed to the support extending beneath the head of said bowling pin, and means for securing a cutting tool on said platform in engagement with a selected portion of said pin head.

10. In the apparatus defined in claim 9, said means for rotatably mounting the bowling pin comprising an arbor fitting with the pin base and a rotatably mounted cup on said platform receiving the pin head.

11. In the apparatus defined in claim 10, means for mounting said cup for displacement axially of said pin and for locking it in adjusted position.

References Cited

UNITED STATES PATENTS

| | | | |
|---|---|---|---|
| 233,150 | 10/1880 | Haven | 269—126 |
| 1,616,909 | 2/1927 | Lorenz et al. | |
| 1,644,530 | 10/1927 | Johnson | 144—27 |
| 1,660,329 | 2/1928 | Fleming | 269—128 |
| 1,802,164 | 4/1931 | Williams. | |
| 2,215,122 | 9/1940 | Hess | 269—128 |
| 2,280,078 | 4/1942 | Petty | 269—128 |
| 3,245,441 | 4/1966 | Nichols. | |

WILLIAM W. DYER, Jr., *Primary Examiner.*

W. D. BRAY, *Assistant Examiner.*